United States Patent

Armstrong

[15] 3,702,011

[45] Oct. 31, 1972

[54] APPARATUS AND METHOD FOR SIMULATING LOGIC FAULTS

[72] Inventor: Douglas Byron Armstrong, Bedminster, N.J.

[73] Assignee: Bell Telephone Laboratories, Incorporated, Murray Hill, N.J.

[22] Filed: May 12, 1970

[21] Appl. No.: 36,581

[52] U.S. Cl. ....................................444/1, 235/151.3

[51] Int. Cl. ..............................................G06f 15/20

[58] Field of Search........235/150, 150.1, 151.3, 151, 235/152; 324/51, 52, 73 R, 73 AT; 444/1

[56] References Cited

UNITED STATES PATENTS

| | | | |
|---|---|---|---|
| 3,377,471 | 4/1968 | Althaus et al | 235/152 |
| 3,441,849 | 4/1969 | Bennett et al | 324/51 X |
| 3,492,571 | 1/1970 | Desler | 324/51 X |

*Primary Examiner*—Joseph F. Ruggiero
*Attorney*—R. J. Guenther and William L. Keefauver

[57] ABSTRACT

Apparatus and method for simulating logic circuit faults. The logic circuit to be simulated is divided into blocks and digital representations of the interconnections in each block are stored in data tables in the digital computer performing the simulation. Each block is dynamically simulated by computing both the error-free outputs and the faulty outputs that would be generated by the block in response to the proper inputs to the block. The result of the simulation is a list of system faults which may be transformed into a fault dictionary comprising a list of each possible trouble symptom and the set of faults that produce it.

14 Claims, 23 Drawing Figures

FIG. 1A

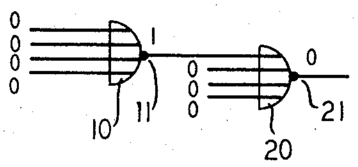

FIG. 1B

| INPUTS | OUTPUT |
|---|---|
| 0 0 0 0 | 1 |
| 0 0 0 1 | 0 |
| 0 0 1 0 | 0 |
| 0 0 1 1 | 0 |
| 0 1 0 0 | 0 |
| 0 1 0 1 | 0 |
| 0 1 1 0 | 0 |
| 0 1 1 1 | 0 |
| 1 0 0 0 | 0 |
| 1 0 0 1 | 0 |
| 1 0 1 0 | 0 |
| 1 0 1 1 | 0 |
| 1 1 0 0 | 0 |
| 1 1 0 1 | 0 |
| 1 1 1 0 | 0 |
| 1 1 1 1 | 0 |

NOR GATE TRUTH TABLE

FIG. 2

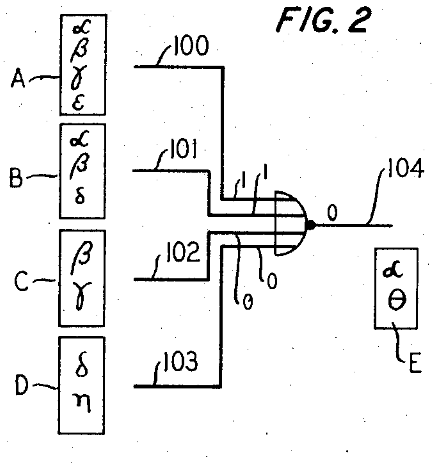

FIG. 1C

FOUR-INPUT NOR GATE FAULT TABLE

| INTERNAL FAULT NUMBER | LOGICAL EFFECT |
|---|---|
| 1 | OUTPUT LOGIC VALUE = 0 |
| 2 | OUTPUT LOGIC VALUE = 1 |
| 3 | OUTPUT LOGIC VALUE = NOR($I_1$, $I_2$, $I_3$) |
| 4 | OUTPUT LOGIC VALUE = NOR($I_2$, $I_3$, $I_4$) |
| 5 | OUTPUT LOGIC VALUE = NOR($I_3$, $I_4$, $I_1$) |
| 6 | OUTPUT LOGIC VALUE = NOR($I_4$, $I_1$, $I_2$) |
| 7 | OUTPUT LOGIC VALUE = NOR($I_1$, $I_2$) |
| 8 | OUTPUT LOGIC VALUE = NOR($I_3$, $I_4$) |
| 9 | OUTPUT LOGIC VALUE = $I_1$ |
| 10 | OUTPUT LOGIC VALUE = $I_2$ |
| 11 | OUTPUT LOGIC VALUE = $I_4$ |

INVENTOR
D. B. ARMSTRONG
BY R. O. Nimtz
ATTORNEY

FIG. 3A

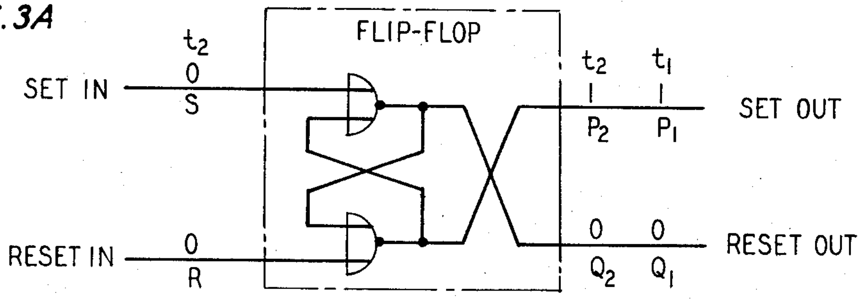

FIG. 3B

FLIP-FLOP TRUTH TABLE

| CURRENT OUTPUT STATES | | NEW INPUTS | | NEW OUTPUT STATES | |
|---|---|---|---|---|---|
| SET | RESET | SET | RESET | SET | RESET |
| 0 | 1 | 0 | 0 | 0 | 1 |
| 0 | 1 | 1 | 0 | 1 | 0 |
| 0 | 1 | 0 | 1 | 0 | 0 |
| 0 | 1 | 1 | 1 | X | X |
| 1 | 0 | 0 | 0 | 1 | 0 |
| 1 | 0 | 1 | 0 | 1 | 0 |
| 1 | 0 | 0 | 1 | 0 | 1 |
| 1 | 0 | 1 | 1 | X | X |

FIG. 3C

FLIP-FLOP FAULT TABLE

| INTERNAL FAULT NUMBER | MNEMONIC | LOGICAL EFFECT |
|---|---|---|
| 1 | $A_S$ | IMPERVIOUS TO INPUTS; HOLDS FLIP-FLOP SET |
| 2 | $B_S$ | HOLDS FLIP-FLOP SET, BUT LATCHES FOR DURATION OF RESET OR LATCH ENABLE |
| 3 | $C_S$ | HOLDS FLIP-FLOP SET, BUT RESETS FOR DURATION OF RESET ENABLE OR LATCHES FOR DURATION OF LATCH ENABLE |
| 4 | $A_R$ | IMPERVIOUS TO INPUTS; HOLDS FLIP-FLOP RESET |
| 5 | $B_R$ | HOLDS FLIP-FLOP RESET, BUT LATCHES FOR DURATION OF SET OR LATCH ENABLE |
| 6 | $C_R$ | HOLDS FLIP-FLOP RESET, BUT SETS FOR DURATION OF SET ENABLE OR LATCHES FOR DURATION OF LATCH ENABLE |
| 7 | D | HOLDS OUTPUTS OF FLIP-FLOP IN 1-1 STATE; LATCHES FOR DURATION OF LATCH ENABLE |

FIG. 3D

| INPUTS S R | OLD OUTPUTS S R | NEW OUTPUTS S R | RACE FAULTS | $P_2$ FAULT SET | $Q_2$ FAULT SET |
|---|---|---|---|---|---|
| 00 | 10 | 10 | $* = P_1\bar{Q}_1\bar{R}\bar{S}$ | $P_2 = R + P_1Q_1\bar{S} + A_R + B_R + C_R$ | $Q_2 = R\bar{S} + Q_1\bar{S} + A_R + B_R + C_R + D$ |
| 10 | 10 | 10 | $* = P_1\bar{Q}_1\bar{R}S$ | $P_2 = R + Q_1S + A_R + B_R$ | $Q_2 = RS + Q_1S + A_R + D$ |
| 01 | 10 | 10 | $* = P_1\bar{Q}_1R\bar{S}$ | $P_2 = RS + R\bar{P} + A_S + D$ | $Q_2 = S + R\bar{P}_1\bar{Q}_1 + A_S + B_S$ |
| 11 | 10 | 00 | $* = P_1\bar{Q}_1RS$ | $P_2 = R\bar{S} + R\bar{P}_1 + A_S$ | $Q_2 = S\bar{R} + Q_1S + A_R$ |
| 1X | 10 | X0 | $* = \emptyset$ | $P_2 = \emptyset$ | $Q_2 = Q_1S + A_R$ |
| X1 | 10 | 0X | $* = \emptyset$ | $P_2 = R\bar{P}_1 + A_S$ | $Q_2 = \emptyset$ |
| 0X | 10 | XX | $* = \emptyset$ | $P_2 = \emptyset$ | $Q_2 = \emptyset$ |
| X0 | 10 | 10 | $* = \emptyset$ | $P_2 = R + A_R + B_R$ | $Q_2 = A_R + D$ |
| XX | 10 | XX | $* = \emptyset$ | $P_2 = \emptyset$ | $Q_2 = \emptyset$ |
| 00 | 01 | 01 | $* = \bar{P}_1Q_1\bar{R}\bar{S}$ | $P_2 = S\bar{R} + P_1\bar{R} + A_S + B_S + C_S + D$ | $Q_2 = S + Q_1P_1\bar{R} + A_S + B_S + C_S$ |
| 10 | 01 | 10 | $* = \bar{P}_1Q_1\bar{R}S$ | $P_2 = R + S\bar{Q}_1\bar{P}_1 + A_R + B_R$ | $Q_2 = RS + S\bar{Q}_1 + A_R + D$ |
| 01 | 01 | 01 | $* = \bar{P}_1Q_1R\bar{S}$ | $P_2 = RS + P_1R + A_S + D$ | $Q_2 = S + P_1R + A_S + B_S$ |
| 11 | 01 | 00 | $* = \bar{P}_1Q_1RS$ | $P_2 = P_1R + R\bar{S} + A_S$ | $Q_2 = S\bar{R} + S\bar{Q}_1 + A_R$ |
| 1X | 01 | X0 | $* = \emptyset$ | $P_2 = \emptyset$ | $Q_2 = S\bar{Q}_1 + A_R$ |
| X1 | 01 | 0X | $* = \emptyset$ | $P_2 = P_1R + A_S$ | $Q_2 = \emptyset$ |
| 0X | 01 | 01 | $* = \emptyset$ | $P_2 = A_2 + D$ | $Q_2 = S + A_S + B_S$ |
| X0 | 01 | XX | $* = \emptyset$ | $P_2 = \emptyset$ | $Q_2 = \emptyset$ |
| XX | 01 | XX | $* = \emptyset$ | $P_2 = \emptyset$ | $Q_2 = \emptyset$ |
| 00 | 00 | XX | $* = \emptyset$ | $P_2 = \emptyset$ | $Q_2 = \emptyset$ |
| 10 | 00 | 10 | $* = \bar{P}_1\bar{Q}_1\bar{R}S$ | $P_2 = R + Q_1S + A_R + B_R$ | $Q_2 = RS + Q_1S + A_R + D$ |
| 01 | 00 | 01 | $* = \bar{P}_1\bar{Q}_1R\bar{S}$ | $P_2 = RS + P_1R + A_S + D$ | $Q_2 = S + P_1R + A_S + B_S$ |
| 11 | 00 | 00 | $* = \bar{P}_1\bar{Q}_1RS$ | $P_2 = R\bar{S} + P_1R + A_S$ | $Q_2 = S\bar{R} + Q_1S + A_R$ |
| 1X | 00 | X0 | $* = \emptyset$ | $P_2 = \emptyset$ | $Q_2 = Q_1S + A_R$ |
| X1 | 00 | 0X | $* = \emptyset$ | $P_2 = P_1R + A_S$ | $Q_2 = \emptyset$ |
| 0X | 00 | XX | $* = \emptyset$ | $P_2 = \emptyset$ | $Q_2 = \emptyset$ |
| X0 | 00 | XX | $* = \emptyset$ | $P_2 = \emptyset$ | $Q_2 = \emptyset$ |
| XX | 00 | XX | $* = \emptyset$ | $P_2 = \emptyset$ | $Q_2 = \emptyset$ |
| -- | 11 | -- | $* = —$ | $P_2 = —$ | $Q_2 = —$ |
| -- | 1X | -- | $* = —$ | $P_2 = —$ | $Q_2 = —$ |

FIG. 3E

| INPUTS S R | OLD OUTPUTS S R | NEW OUTPUTS S R | RACE FAULTS | $P_2$ FAULT SET | $Q_2$ FAULT SET |
|---|---|---|---|---|---|
| – – | X 1 | – – | * = – | $P_2$ = – | $Q_2$ = – |
| 0 0 | 0 X | X X | * = $\phi$ | $P_2 = \phi$ | $Q_2 = \phi$ |
| 1 0 | 0 X | 1 0 | * = $\phi$ | $P_2 = R+A_R+B_R$ | $Q_2 = RS+A_R+D$ |
| 0 1 | 0 X | 0 1 | * = $\phi$ | $P_2 = RS+P_1R+A_S+D$ | $Q_2 = S+P_1R+A_S+B_S$ |
| 1 1 | 0 X | 0 0 | * = $\phi$ | $P_2 = R\bar{S}+RP_1+A_S$ | $Q_2 = S\bar{R}+A_R$ |
| 1 X | 0 X | X 0 | * = $\phi$ | $P_2 = \phi$ | $Q_2 \quad A_R$ |
| X 1 | 0 X | 0 X | * = $\phi$ | $P_2 = P_1R+A_S$ | $Q_2 = \phi$ |
| 0 X | 0 X | X X | * = $\phi$ | $P_2 = \phi$ | $Q_2 = \phi$ |
| X 0 | 0 X | X X | * = $\phi$ | $P_2 = \phi$ | $Q_2 = \phi$ |
| X X | 0 X | X X | * = $\phi$ | $P_2 = \phi$ | $Q_2 = \phi$ |
| 0 0 | X 0 | X X | * = $\phi$ | $P_2 = \phi$ | $Q_2 = \phi$ |
| 1 0 | X 0 | 1 0 | * = $\phi$ | $P_2 = R+SQ_1+A_R+B_R$ | $Q_2 = RS+Q_1S+A_R+D$ |
| 0 1 | X 0 | 0 1 | * = $\phi$ | $P_2 = RS+A_S+D$ | $Q_2 = S+A_S+B_S$ |
| 1 1 | X 0 | 0 0 | * = $\phi$ | $P_2 = R\bar{S}+A_S$ | $Q_2 = S\bar{R}+Q_1S+A_R$ |
| 1 X | X 0 | X 0 | * = $\phi$ | $P_2 = \phi$ | $Q_2 = Q_1S+A_R$ |
| X 1 | X 0 | 0 X | * = $\phi$ | $P_2 = A_S$ | $Q_2 = \phi$ |
| 0 X | X 0 | X X | * = $\phi$ | $P_2 = \phi$ | $Q_2 = \phi$ |
| X 0 | X 0 | X X | * = $\phi$ | $P_2 = \phi$ | $Q_2 = \phi$ |
| X X | X 0 | X X | * = $\phi$ | $P_2 = \phi$ | $Q_2 = \phi$ |
| 0 X | X X | X X | * = $\phi$ | $P_2 = \phi$ | $Q_2 = \phi$ |
| 1 0 | X X | 1 0 | * = $S\bar{R}$ | $P_2 = R+A_R+B_R$ | $Q_2 = RS+A_R+D$ |
| 0 1 | X X | 0 1 | * = $R\bar{S}$ | $P_2 = RS+A_S+D$ | $Q_2 = S+A_S+B_S$ |
| 1 1 | X X | 0 0 | * = RS | $P_2 = R\bar{S}+A_S$ | $Q_2 = S\bar{R}+A_R$ |
| 1 X | X X | X 0 | * = $\phi$ | $P_2 = \phi$ | $Q_2 = A_R$ |
| X 1 | X X | 0 X | * = $\phi$ | $P_2 = A_S$ | $Q_2 = \phi$ |
| 0 X | X X | X X | * = $\phi$ | $P_2 = \phi$ | $Q_2 = \phi$ |
| X 0 | X X | X X | * = $\phi$ | $P_2 = \phi$ | $Q_2 = \phi$ |
| X X | X X | X X | * = $\phi$ | $P_2 = \phi$ | $Q_2 = \phi$ |

LLST ENTRY

ALL FAULT TABLE

| HARDWARE LOCATION DESCRIPTION | ABSOLUTE FAULT NUMBER | INTERNAL FAULT NUMBER |
|---|---|---|
| GATE 34Y | 1 | 1 |
| GATE 34Y | 2 | 2 |
| ⋮ | ⋮ | ⋮ |
| GATE 34Y | 11 | 11 |
| ⋮ | ⋮ | ⋮ |
| GATE 68Z | 37 | 1 |
| GATE 68Z | 38 | 2 |
| ⋮ | ⋮ | ⋮ |
| GATE 68Z | 46 | 10 |
| GATE 68Z | 47 | 11 |
| ⋮ | ⋮ | ⋮ |

| ERROR SYMPTOMS | FAULTS |
|---|---|
| 1 1 0 0 | a, b |
| 1 0 1 0 | c, e |
| 0 1 0 1 | d |
| 0 0 0 1 | f |

FIG. 9B

FAULT TRUTH TABLE

| LOGIC ELEMENT TYPE | INPUTS | | | | INTERNAL FAULT NUMBER |
|---|---|---|---|---|---|
| TWO INPUT NOR | $I_1$ | $I_2$ | | | |
| | 0 | 0 | | | 1, 3 |
| | 0 | 1 | | | 2, 4 |
| | 1 | 1 | | | 1, 2 |
| | 1 | 0 | | | 7, 9 |
| ⋮ | ⋮ | | | | ⋮ |
| FOUR INPUT NOR | $I_1$ | $I_2$ | $I_3$ | $I_4$ | |
| | 0 | 0 | 0 | 0 | 1, 9, 10, 11 |
| | 0 | 0 | 0 | 1 | 2, 3, 7, 11 |
| | 0 | 0 | 1 | 0 | 2, 6, 7 |
| | 0 | 0 | 1 | 1 | 2, 7 |
| | ⋮ | | | | ⋮ |
| | 1 | 1 | 0 | 0 | 2, 8 |
| | 1 | 1 | 0 | 1 | 2 |
| | 1 | 1 | 1 | 0 | 2 |
| | 1 | 1 | 1 | 1 | 2 |
| ⋮ | ⋮ | | | | ⋮ |

| LOGIC ELEMENT TYPE | CURRENT OUTPUT | | NEW INPUT | | NEW OUTPUT | | FAULTS DELETED ON SET OUTPUT | FAULTS DELETED ON RESET OUTPUT |
|---|---|---|---|---|---|---|---|---|
| FLIP-FLOP | SET | RESET | SET | RESET | SET | RESET | | |
| | 1 | 0 | 0 | 0 | 1 | 0 | 4, 5, 6 | 4, 5, 6, 7 |
| | 1 | 0 | 1 | 0 | 1 | 0 | 4, 5 | 4, 7 |
| | ⋮ | | ⋮ | | ⋮ | | ⋮ | ⋮ |

APPARATUS AND METHOD FOR SIMULATING LOGIC FAULTS

GOVERNMENT CONTRACT

The invention herein claimed was made in the course of, or under contract with the Department of the Army.

BACKGROUND OF THE INVENTION

1. Field of the Invention

This invention relates to machine-implemented processes for simulating digital logic circuitry. More particularly, this invention relates to programmed digital computers used in the generation of fault lists which may be transformed into fault dictionaries for large scale digital systems.

2. Description of the Prior Art

Recent years have witnessed an enormous growth in the fields of digital computation and control. This growth has been due to an appreciation of the power of digital systems which has coincided with increasingly sophisticated circuit fabrication techniques. As a result, it is now possible to build large scale systems capable of performing a variety of intricate tasks.

As the size of digital systems has increased, so have the problems associated with the maintenance of these systems. Maintenance problems are particularly acute in large digital systems because it is extremely difficult to predict the effect of a circuit fault, that is, a component that becomes short-circuited or open-circuited. Since maintenance implies the ability to detect error conditions and determine the source of the trouble from these conditions, a means, suitable for use in a large system, for correlating error conditions with system faults is required.

This correlation means would ideally take the form of a list, which might be called a fault dictionary, in which all the error symptoms corresponding to each detectable error are listed. An error symptom is defined to be the incorrect bit pattern that will actually exist in a monitored register due to the presence of some fault. The fault dictionary is used by the digital system to translate a reported error symptom into an indication of the physical location of the fault.

The most obvious way to produce a fault dictionary would be to physically insert faults into the system and record the resulting error symptoms. This method would be very difficult for even the very smallest of systems, and would be practically impossible for a large system comprised of integrated circuit chips, each containing many logic gates.

The only practical method of producing a fault dictionary for a large system is by using digital simulation methods. The simulation of a large system requires considerable effort since it is necessary in all cases to develop and store in a computer memory a representation of each circuit in the system which is to be simulated. Once this has been done, a considerable amount of computation time is required to execute a program capable of performing the actual fault simulation upon the stored representation of the system.

The complexity of fault simulation is readily apparent when prior art simulators are considered. For example, the simulator described in the article "On An Improved Diagnostic Program" by S. Seshu appearing in the Institute of Electrical and Electronics Engineers Transactions on Electronic Computers, Vol. EC-14, Feb. 1965, pages 76–79, and the simulator described in the article "Design of a Fault Simulator for Saturn Computer Design" by Hardie and Suhocki, appearing in Wescon Technical Paper, Vol. 10, Pt. 4, 1966, pages 1–22, are capable of simulating $N$ faults independently but simultaneously, where $N$ is the number of bits in a word of the computer being used to perform the simulation. Thus, if a block of logic circuitry to be simulated contains any one of $M$ possible faults, it is necessary to perform the simulation $M/N$ times in order to generate the symptoms for each possible fault. For large blocks of logic circuitry, say each block containing 10,000 nodes, $M$ will be in the neighborhood of 60,000, and if the computer performing the simulation is assumed to have a 60 bit word, $N$ will equal 60, causing $M/N$ to be equal to 1,000, indicating that the simulation program would have to be executed 1,000 times in order to obtain all of the trouble symptoms. In a large system containing many such blocks, the total computer time required to execute the simulation can be in the range of thousands of hours. This estimate, of course, does not include the large amount of time, measurable in man-years, required to write the simulation program and to prepare the data tables containing the digital representation of the system to be simulated.

It is an object of this invention to provide a method of simulating digital logic circuitry in order to provide information for constructing a fault dictionary.

It is a specific object of this invention to provide a method of simulating digital logic circuitry which is applicable to very large digital systems.

It is a more specific object of this invention to provide a method of simulating digital logic circuitry in which all error symptoms for all faults are obtained in a single simulation run, thereby resulting in a large saving of simulation time over the prior art.

SUMMARY OF THE INVENTION

These objects are achieved in accordance with the invention by storing a digital representation of the interconnections of the logic circuit to be simulated in data tables in the computer performing the simulation. These digital representations are divided into blocks and each block is dynamically simulated by computing the outputs that would result from sequentially applying a selected set of inputs to the block. At regular intervals, the logical value at the output of each gate in the block is computed if and only if one or more of its simulated inputs or input fault lists changed during the preceding interval. Simultaneously, the faults occurring in previous stages whose effects have propagated to the gate in question are examined to determine whether or not they will affect the gate's output and hence continue to propagate through the circuit. This determination insures that only those faults that actually affect the circuit's logic values will continue to be simulated, thus decreasing the time needed for simulation. These propagating faults, along with all faults internal to the gate that would be detectable at the gate's output, are placed in the gate's output fault list for use in simulating succeeding gates. The congeries of fault lists produced by this simulation may then be transformed into a fault dictionary which comprises a list of each possible trouble symptom and the set of faults that produce it.

BRIEF DESCRIPTION OF THE DRAWING

FIGS. 1A, 1B, and 1C show the manner in which faults associated with a NOR gate are found in accordance with the present invention;

FIG. 2 is an example of the propagation of fault lists through a NOR gate according to the algorithm of this invention;

FIGS. 3A, 3B, 3C, 3D and 3E show the manner in which faults are determined for and propagated through a flip-flop in accordance with this invention;

FIGS. 9A and 9B show additional data structures used by the machine method; and FIGS. 10A and 10B show an example of the use of the results of the machine method of the present invention.

DETAILED DESCRIPTION

Figure 4:
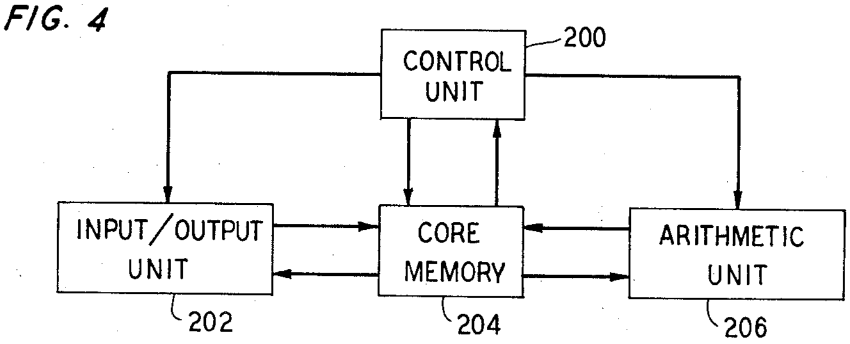
FIG. 4 illustrates the structure of a general-purpose digital computer suitable for performing the machine method of the present invention.

The production of a fault dictionary in accordance with the present invention requires two distinct steps: the generation of fault lists using the novel algorithm of this invention, and the use of the fault lists in the well-known manner to construct a table listing each error symptom and its accompanying list of faults. The basic method of generating fault lists for a digital system will now be explained.

The system to be simulated must first be digitally represented in a form suitable for use in the simulation. Each node in the system must be uniquely identified. The term "node" is here understood to mean the output terminal of either a logic gate, half of a flip-flop, a delay line, or an inverter. Logic equations that described the behavior of each of these elements must be developed, in the manner to be described, to allow the computation of the logic value that will appear on each node in response to an applied input signal. These logic equations are then stored in the computer, termed the "host" computer, which is to perform the simulation.

The stored logic equations are then arbitrarily divided into blocks for the dynamic simulation. In order to understand the concept of dynamic simulation, it is necessary to consider what happens during an actual hardware test. If input signals were actually being applied to the block of logic that is being simulated, these signals would propagate through the block causing successive changes in the state of the circuit. These successive changes in state would occur at regular intervals as the input signals propagated through each stage of the circuit — the regular intervals being equal to the single-stage delay time of the circuit — and they could be observed by monitoring the circuit output at these regular intervals. The dynamic simulation achieves this effect by successively computing what the state of the circuit would be at each of these regular intervals. Since the computation of the successive states takes longer than an actual signal would take to propagate through the circuit, the simulation involves two time frames: the time sequence which is being simulated and which represents the dynamic action of the circuit; and the computation time of the host computer required to simulate the dynamic action.

The computation of the successive changes in state utilizes the "sensitized path" technique. A "sensitized path" is understood to mean a series of interconnected nodes such that if a fault occurs in any one of these nodes, the logical effect of the fault will propagate along the path and eventually be observed at some monitor point. Sensitized paths between the input and output terminals of a nodal block are determined by examining the logic values on the inputs to the node for the fault-free circuit.

For example, consider the two NOR logic gates shown in FIG. 1A. The output of gate 10 comprises node 11 and the output of gate 20 comprises node 21. In accordance with standard concepts of logic design, the logical function of a NOR gate is as shown in the truth table of FIG. 1B, which may be stated in words as follows: If all fan-ins are 0, then the output is a 1; if + one or more fan-ins is a 1, then the output is a 0. Assuming that the normal fault-free inputs to gates 10 and 20 are as shown in FIG. 1A, node 11 will have a logic value of 1 and node 21 will have a logic value of 0. If a fault occurred which caused any of the inputs to gate 10 to change to 1, then the value of node 11 would change from a 1 to a 0. This, in turn, would cause the logic value of node 21 to change from a 0 to a 1 since node 11 is a fan-in to gate 20. Thus the logical effect of the fault at the input to gate 10 propagates to node 21. Gates 10 and 20 are therefore members of the same sensitized path.

The sensitized path technique is used in accordance with the algorithm of the present invention to perform "selective tracing." "Selective tracing" is the process of periodically computing the current state of any node only if one or more of its input values changed during the preceding interval. As previously described, these intervals would be equal to the single-stage delay time of the circuit being simulated. The current state of a node that is computed by the selective tracing process includes both the error-free logic value of the node and an associated list of faults. This list comprises faults which, if any one were present singly in the logic, would be in the sensitized path of the node. Since the fault list of each node is recomputed when and only when one of the fault lists associated with the node's inputs change, all lists are kept current with a reduction in simulation time relative to prior art procedures that evaluate the state of every node at every interval. The instant process of updating particular lists at each interval provides an accurate record of all faults that are detectable at any node at any time during execution of a sequence of input signals applied to the logic block.

The particular manner in which the algorithm of the present invention uses selective tracing to generate fault lists can best be appreciated by considering some typical logic elements.

PROPAGATION OF FAULT LISTS THROUGH A NOR GATE

FIG. 2 shows a NOR gate similar in all respects to the gates 10 and 20 of FIG. 1A. The logic value associated with this gate can be found from the input logic values and the truth table of FIG. 1B. The fault list associated with the output of this gate will include two types of faults: faults located in preceding logic stages whose effects propagate through the gate in question to produce an incorrect logic value at its output; and faults occurring within the gate that produce an incorrect logic value at the gates's output. In order to determine which faults from preceding stages propagate to the output fault list of the gate, the input fault lists to the gate must be examined. The input fault lists to a gate are, of course, the output lists of the nodes of preceding stages which feed the gate.

The inputs fault lists associated with inputs 100 through 103 of the NOR gate of FIG. 2 are denoted by the letters A through D, respectively. The entries in these lists are shown symbolically in FIG. 2 as lower case Greek letters for convenience of description. Each such entry is understood to stand for a digital word which serves to uniquely identify the particular node in a preceding stage in which the fault originally arose. It can be seen that several of the faults appear in more than one input list. These are faults occurring in earlier logic stages whose effects have propagated over several paths to the gate. The problem, then, is to determine the output fault list, E, appearing on the output line 104 of the gate.

In order for a fault in any of the input lists to appear in E, it must cause the error-free output on line 104 to be complemented. In FIG. 2, with the error-free inputs and output presumed to be as shown, this means it must cause a 1 to be generated on line 104. Analyzing the NOR gate truth table shown in FIG. 1B, it becomes evident that the presence of a fault in preceding logic stages will be detectable at line 104 only if it causes all of the 1's on the gate's inputs to change to 0's and, at the same time, does not cause any of the 0's on the gate's inputs to change to a 1. From this it follows that only those faults that appear in both of lists A and B and in neither of lists C and D will cause a 1 to be generated on line 104. Only fault $\alpha$ satisfies this requirement. Fault $\beta$, for example, does not because, although it appears on both of lists A and B, it also appears on list C.

The procedure for determining which faults propagate through the gate can be formalized by expressing the output list E as a mathematical set function of the input lists. In the notation of set theory, then, A, B, C, and D represent sets of input faults, and E represents the set of output faults of the gate of FIG. 2. Letting $E_1$ represent that subset of E which consists of faults external to the gate that propagate to its output via its inputs, and letting $E_2$ represent that subset of E which consists of faults internal to the gate, E can be expressed as:

$$E=E_1+E_2 \qquad 1.$$

where the + sign represents mathematical set union. Since $E_1$ is the set of faults each of which will cause the gate's output to be complemented, its logical expression, in accordance with the discussion of the previous paragraph, is the set of all faults appearing in set A AND set B AND NOT in set C OR set D. That is:

$$E_1=A\cdot B\cdot\overline{(C+D)} \qquad 2.$$

where the product sign represents mathematical set intersection.

It is evident that the expression for $E_1$ is dependent on the error-free logic values appearing on the gate's inputs, and that the output fault list must be recomputed whenever one or more input logic values, or associated input fault lists, change. For example, if the error-free inputs to the gate of FIG. 2 were all 0's, the error-free output value would be a 1 and equation (2) would become:

$$E_1=A+B+C+D, \qquad 3.$$

because in this case a fault in any input list would produce a 0 at the output.

In actual practice, the expression for $E_1$ may be obtained by using the following simple algorithm, which may be termed the NOR algorithm. Take the set intersection of all the input fault lists associated with 1 inputs. Take the set union of all the input fault lists associated with 0 inputs. If there are any "1" inputs, subtract the union list from the intersection list. If all input logic values are "0, " then the result is the intersection list. This algorithm also applies directly to OR gates. The algorithm applicable to NAND and AND gates is obtained by interchanging the terms "1" and "0" in the NOR algorithm.

The faults comprising set $E_2$ may be determined by referring to a truth table representing the behavior of the NOR gate when the various internal faults are present. Distinct physical faults internal to a gate which have the same (faulty) truth table are not distinguishable, and are treated as a single fault. The internal faults that can occur for each type of gate used in a system must be determined by experimental techniques, that is, the components comprising the gate must be examined to determine the effect on the gate's output of the failure of any particular one of these components. FIG. 1C is an example of a table of internal faults that might be applicable to a four-input NOR gate. The "internal fault numbers" shown in FIG. 1C are used by the simulation program in the manner hereinafter described under the heading "Machine Implementation of the Process."

In the above example, suppose $\Phi$ is an internal fault which would cause the output to be stuck at 0, while $\theta$ is an internal fault which would cause the output to be stuck at 1. Since the error-free output is a 0, $E_2$ will contain the single fault $\theta$. This is true because as long as the value of the error-free inputs remains the same, a stuck-at-0 output is correct and therefore not detectable. Indeed, this fault could conceivably prevent the propagation of a fault from a previous stage. If the values of the error-free inputs were to change in such a manner that the error-free output became a 1, then $E_1$ would contain the fault $\Phi$.

Completing this example, since $E_1 = (\alpha)$ and $E_2 = (\theta)$, $$E = E_1 + E_2 = (\alpha, \theta). \qquad 4.$$

PROPAGATION OF FAULT LISTS THROUGH A FLIP-FLOP

FIG. 3A shows a typical flip-flop. This flip-flop can be seen to comprise a pair of cross-coupled NOR gates. The generation of the output logic value for a flip-flop can be performed by using the truth table of FIG. 3B in the same manner that the truth table of FIG. 1B is used for NOR gates. The generation of fault lists for the flip-flop is, however, more complicated than for gates primarily because a flip-flop can "remember" the effects of faults which were propagated to its inputs at a previous time in the input signal sequence. For example, at some time in the input sequence a particular fault might cause a flip-flop to be erroneously set. The erroneous setting signal might then disappear but, in the absence of a subsequent resetting signal, the flip-flop will remain set and the fault will be detectable at its outputs as long as the erroneous set state persists.

To correctly account for this memory property, the new fault lists that are computed for a flip-flop's outputs at any time $t_i$ must contain, in addition to faults appearing in the input fault lists at time $t_1$, faults from the output fault lists which were present at time $t_{i-1}$. To these must be added any internal flip-flop faults which are detectable on its outputs at $t_1$. As will now be shown, expressions for the new output fault lists in terms of the previous output fault lists and the current input fault lists can be derived in a manner analogous to the treatment of the NOR gate.

The fault lists present at the set and reset outputs of the flip-flop, shown in FIG. 3A, at time $t_1$, are denoted by $P_1$ and $Q_1$, respectively. S and R represent the fault lists present on the set and reset inputs, respectively, at some time $t_2$ when the selective tracing criteria indicate that the state of the flip-flop again be reevaluated. The problem is thus to evaluate the new output faults lists, $P_2$ and $Q_2$.

The computation of the new lists depends upon the logic state of the flip-flop at time $t_1$, the new logic inputs to the flip-flop at time $t_2$, and the associated fault lists. Therefore, the computation must be made for each combination of previous state and present inputs. In the example of FIG. 3A, the flip-flop is assumed to be in the set state at $t_1$ and the inputs are assumed to be quiescent at $t_2$. In this case, the next state of the flip-flop is again the set state.

Treating the various fault lists as mathematical sets, $P_2$ and $Q_2$ may be expressed as logical "sum of products" functions of the sets $P_1$, $Q_1$, R and S. That is, $P_2$ and $Q_2$ may be expressed as the union of appropriate subsets of the 16 fundamental products: $P_1Q_1RS$, $P_1Q_1R\overline{S}$, . . . ,$\overline{P}_1\overline{Q}_1\overline{R}\overline{S}$. Each of these products must be examined to determine whether it should be present in the expression for $P_2$ or $Q_2$.

For example, consider the product $P_1Q_1RS$. This product represents all faults that exist in fault lists $P_1$ AND $Q_1$ AND R AND S at time $t_2$. $P_1$ and $Q_1$ are the output fault lists that were generated at time $t_1$ and R and S are the new input fault lists that are present at time $t_2$. Hence any fault in the product $P_1Q_1RS$, for the error-free inputs and outputs shown in FIG. 3, will cause the flip-flop to be in the reset state at time $t_1$ and cause both its set and reset inputs to be 1's at time $t_2$. This will cause both flip-flop outputs to go to 0 at $t_2$ whereas the error-free output at $t_2$ is a 1 on the set output and a 0 on the reset output. Consequently, the product $P_1Q_1RS$ is present in the expression for $P_2$ but is absent from the expression for $Q_2$.

Next consider the product $P_1Q_1R\overline{S}$. Any fault in this product is in $P_1$ AND $Q_1$ AND R AND NOT in S. A fault in both $P_1$ and Q means that the flip-flop of FIG. 3A would be in the reset state at $t_1$. A fault in R and not in S means that at time $t_2$ a 1 will be present at the reset input and a 0 at the set input. These conditions will cause the flip-flop to be in the reset state at time $t_2$. This fault could therefore be detected at both outputs at $t_2$ and so $P_1Q_1R\overline{S}$ will appear in the expression for both $P_2$ and $Q_2$.

Analogous reasoning applies to the remaining products; however, there are two special cases that require further explanation.

The first case involves the product $P_1\overline{Q}_1\overline{R}\overline{S}$. A fault in this product would cause both flip-flop outputs to be at 0 at time $t_1$ and hence the feedback inputs to the two NOR gates making up the flip-flop will be 0 at $t_2$. Since the subproduct $\overline{R}\overline{S}$ means that the set and reset inputs to the flip-flop are the error-free values, it can be seen that at time $t_2$ both of the NOR gates of the flip-flop will have all 0 inputs and both will try to change their outputs from 0 to 1. However, as soon as one gate changes it will block the other one from changing. Because it is not known which will change first, it is not known whether the flip-flop will end up in the set or reset state. This is known as a "race condition." A fault causing a race condition may or may not be detectable, depending on which state the flip-flop goes to as a result of the race. Such faults will hereinafter be termed "race faults."

When evaluating fault lists on flip-flop outputs, the simulator handles the race faults in the same manner as the regular faults (those which are detected with certainty) but inserts a distinguishing flag in each race fault entry. A race fault that propagates to monitored outputs during any particular input sequence generates two error symptoms. In one, the outputs it propagates to are in error; in the other, these outputs are not in error. Both are included in the fault dictionary.

The above discussion is based on the assumption that a race fault causes only one flip-flop to race in any particular input sequence. If the fault causes N flip-flops to race, it is possible for as many as $2^N$ error symptoms to occur. However, empirical studies indicate that the assumption will be true for most logic blocks.

The second special case concerns the three products $\overline{P}_1Q_1RS$, $\overline{P}_1Q_1\overline{R}\overline{S}$, and $\overline{P}_1Q_1\overline{R}S$. These three products indicate that the flip-flop outputs are both 1's. This condition cannot be caused by a fault external to the flip-flop and therefore these three products are all null. In logic design terminology these products are "don't care" conditions and can be included in expressions for either $P_2$ or $Q_2$ if such inclusion permits simplification of these expressions.

An analysis of all 16 fundamental products for the example of FIG. 3A results in the following sum-of-products expressions for $P_2$ and $Q_2$:

$$\begin{aligned} P_2 = P_1\overline{Q}_1\overline{R}\overline{S} + [&P_1Q_1RS + P_1Q_1R\overline{S} + P_1Q_1\overline{R}\overline{S} \\ &+ P_1\overline{Q}_1RS + P_1\overline{Q}_1R\overline{S} + \overline{P}_1\overline{Q}_1RS + \overline{P}_1\overline{Q}_1R\overline{S} \\ &+ (\overline{P}_1Q_1RS) + (\overline{P}_1Q_1R\overline{S})] \end{aligned} \qquad (5)$$

$$Q_2=P_1\overline{Q}_1\overline{R}\overline{S}+[P_1Q_1R\overline{S}+P_1Q_1\overline{R}\overline{S}+P_1\overline{Q}_1R\overline{S}+\overline{P}_1\overline{Q}_1R\overline{S}+\overline{P}_1Q_1\overline{R}\overline{S}+(\overline{P}_1Q_1R\overline{S})] \quad (6)$$

The products in parentheses in equations (5) and (6) are null products included to permit simplification. The first term in these equations is the race fault which is not included in the simplification process. Simplifying the bracketed portions of equations (5) and (6) yields:

$$P_2=P_1\overline{Q}_1\overline{R}\overline{S}+R+P_1Q_1\overline{S} \quad 7.$$

$$Q_2=P_1\overline{Q}_1\overline{R}\overline{S}+Q_1\overline{S}+R\overline{S}. \quad 8$$

Equations (7) and (8) only include those faults that propagate through the flip-flop; it is necessary to add to these lists any faults internal to the flip-flop which are detectable at $t_2$. The internal faults that can occur in a particular type of flip-flop must be determined by experimental techniques in the same manner as is done for logic gates. FIG. 3C shows an example of an internal fault table that might be applicable to a flip-flop such as is shown in FIG. 3A. The "internal fault numbers" shown in FIG. 3C are used by the simulation program in the manner hereinafter described under the heading "Machine Implementation of the Process." The column labeled "Mnemonic" contains additional labels for the internal faults that are included in FIGS. 3D and 3E.

Several of the internal faults shown in FIG. 3C are detectable under the conditions of the example shown in FIG. 3A. Faults $A_R$, $B_R$, and $C_R$ would be detectable on both the set and reset outputs at $t_2$ and would therefore be included in both $P_2$ and $Q_2$. Fault D would only be detectable at the reset output at $t_2$ and hence would only be included in $Q_2$. Faults $A_S$, $B_S$, and $C_S$ would not be detectable at either output. The complete expressions for $P_2$ and $Q_2$ are thus $$P_2=P_1\overline{Q}_1\overline{R}\overline{S}+R+P_1Q_1\overline{S}+A_R+B_R+C_R \quad 9.$$

$$Q_2=P_1\overline{Q}_1\overline{R}\overline{S}+Q_1\overline{S}+R\overline{S}+A_R+B_R+C_R+D. \quad 10.$$

Equations (9) and (10) are only valid for the input and previous state conditions shown in FIG. 3A. A set of equations covering all possible input and previous state conditions must be available to the simulation program. These equations, each of which is derived in a manner analogous to the above example, are shown in FIGS. 3D and 3E. The quantity "X" appearing in FIGS. 3D and 3E signifies an unknown. The quantity "Φ" signifies a null set.

PROPAGATION OF FAULT LISTS THROUGH OTHER LOGIC ELEMENTS

In order to perform fault computations for more complex logic devices, such as shift registers, they are first decomposed into appropriately interconnected networks of gates and flip-flops. The only logic elements which cannot be decomposed into these basic elements are delay lines. The output fault lists for delay lines are merely delayed replicas of their input fault lists. In general, delay lines may be assumed to contain no internal faults because, in fact, delay lines are highly reliable and relatively few are used in most logic circuits.

In addition to the previously described race faults other fault list entries may be uncertain due to an uncertainty in the error-free logic value inputs. These faults are treated in the same manner as race faults, that is, a distinguishing flag is inserted in each such fault entry. These faults and the race faults may be collectively referred to as "star faults."

MACHINE IMPLEMENTATION OF THE PROCESS

The novel process comprising this invention is described by the digital computer program listing shown in the Appendix. This program listing is written in FORTRAN IV and GMAP in accordance with the General Electric Company programming manuals GE-600 Line FORTRAN IV Reference Manual, CPB-1006G, Sept., 1964, revised Mar., 1969, and GE-625/635 Programming Reference Manual CPB-1004E, July 1964, revised Mar., 1967. The listing is seen to be a description of the set of electrical control signals that serve to reconfigure a suitable general-purpose digital computer into a novel machine capable of performing the invention. The steps performed by the novel machine on these electrical control signals comprise the best mode contemplated to carry out the invention.

The use of the listing of the Appendix restricts this particular program to use on a General Electric computer, such as the GE 635 computer. The manner in which this listing may be reprogrammed in another assembly language or in a compiler language is well-known to those skilled in the art. For example, the process can be practiced by using any general purpose digital computer of the type as shown in FIG. 4 having a control unit 200, an input-output unit 202, a core memory 204, and an arithmetic unit 206.

The program listing is more readily understood with the aid of the flow charts of FIGS. 8A to 8E. These flow charts can be seen to include four different symbols. The oval symbols are terminal indicators and signify the beginning and end of the program. The rectangles, termed "operation blocks" contain the description of a particular detailed operational step of the process. The diamond shaped symbols, termed "conditional branch points," contain the description of a particular decisional step of the process. The circles are merely used as drawing aids to prevent overlapping lines.

Before proceeding to a detailed description of the flow charts of FIGS. 8A to 8E it is advantageous to consider the data structures used by the novel process. The basic data structures used by the simulation program comprise data lists shown in block form in FIG. 5. The arrows interconnecting the blocks of FIG. 5 show the manner in which pointer words are used to enable accessing the proper words in each list.

Figure 5:
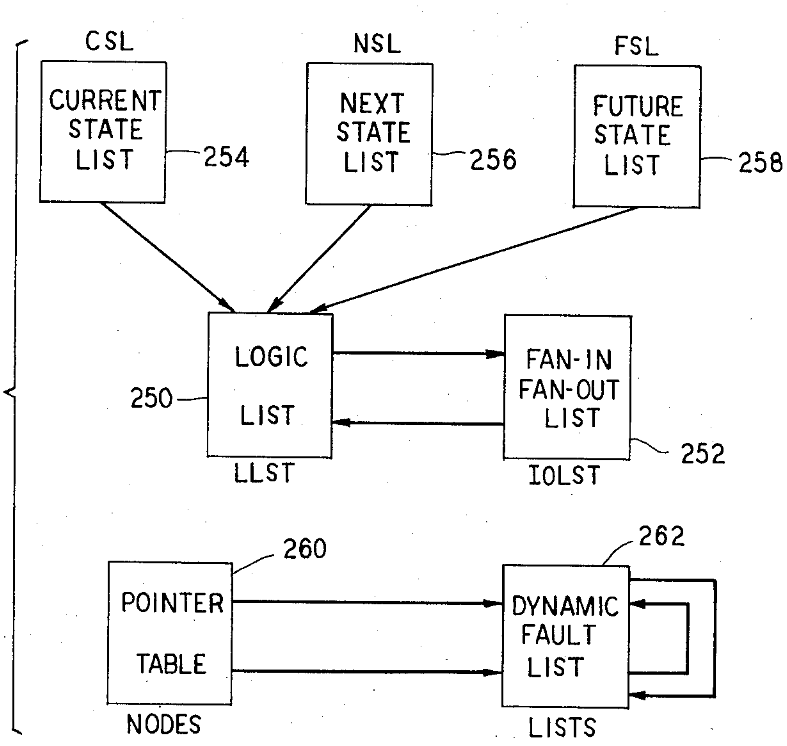
FIG. 5 shows the data structures used by the machine method.

The Logic List (LLST), shown as block 250 in FIG. 5, is the basic data structure of the simulator. LLST is a list which contains information uniquely describing each logic node in the block currently being simulated. Each row in LLST contains information describing a single logic node. Each node is identified by its location in LLST, that is, its row number.

Figure 6:
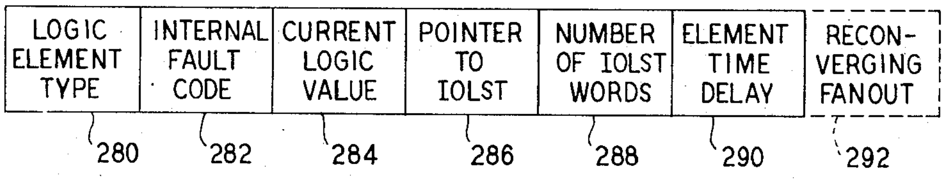
FIG. 6 shows a more detailed view of one of the data structures shown in FIG. 5.

The information contained in each LLST entry is shown in FIG. 6. Field 280 contains a code that identifies the particular logic element type at the node, for example, whether the node is the output of a NOR gate, a flip-flop, a delay line, etc. Field 282 contains the internal fault code which serves to identify the particular internal faults associated with the particular logic element. Field 284 contains, at any given time during the simulation, at any given time at any given time the current logic value of the node, and is thus the only field of the LLST entry that changes during a simulation. Field 286 is a pointer to the Input/Output list, IOLST, shown as block 252 in FIG. 5. Field 288 is a code containing the number of words of IOLST that describe the fan-ins and fan-outs of the node. Field 290 contains the element's delay time expressed as an integral number of single-stage delay periods. Field 292 is an optional field which may be used in an alternative embodiment in the manner to be described.

Returning then to FIG. 5, it is seen that the single pointer from LLST points to the Fan-In Fan-Out List of block 252. This pointer corresponds to fields 286 and 288 shown in FIG. 6. The entries in IOLST that are thus pointed to by the LLST entry indicate the nodes that fan in to the node under consideration as well as the nodes that fan out of that node. Since LLST is the only list that contains the information concerning each node, the IOLST entries are merely pointers back into LLST.

The Current State List (CSL), shown as block 254 in FIG. 5, contains pointers to all nodes in LLST which are active at the current time during the simulation, that is, CSL contains pointers to all nodes whose inputs or input fault lists changed during the last time period. The Next State List (NSL), shown as block 256 in FIG. 5, contains pointers to all nodes whose inputs will change at the next time period as a result of the activity of the nodes currently on the Current State List. Thus, it is necessary that the fan-out pointers of the nodes currently in the CSL be elements of the NSL.

The Future State List (FSL), shown as block 258 in FIG. 5, also contains pointers to the LLST. Each entry in the FSL comprises a pointer to a node which will change at some time later than the current simulation time. Each such pointer has associated with it the time that the node pointed to will become active as well as the logic value that it will assume at that time.

These five lists are used in the manner to be described to achieve the proper time sequence of the propagation of the error-free logic values through the logic block currently being simulated. On the other hand, the lists shown as block 260 and 262 in FIG. 5 are used by the simulation program to allow the propagation of the fault lists through the logic block being simulated.

The fault lists, one list per node, are stored in the Dynamic Fault List (LISTS) shown as block 262 in FIG. 5. Dynamic storage is used because of the wide variations in size which the individual fault lists undergo during a simulation run. Each entry in LISTS occupies a word; one-half of the word contains the fault name and the other half contains a pointer to the next entry. The pointer is zero if its entry is the last one in the particular fault list.

Rapid access to any particular fault list in LISTS is provided by the Pointer Table (NODES) shown as block 260 in FIG. 5. NODES contains one word per fault list. This word has the same index as the row index of the node it is associated with in LLST. One-half of each word in NODES points to the first entry and the other half points to the last entry in the associated fault list in LISTS.

Figure 7A:
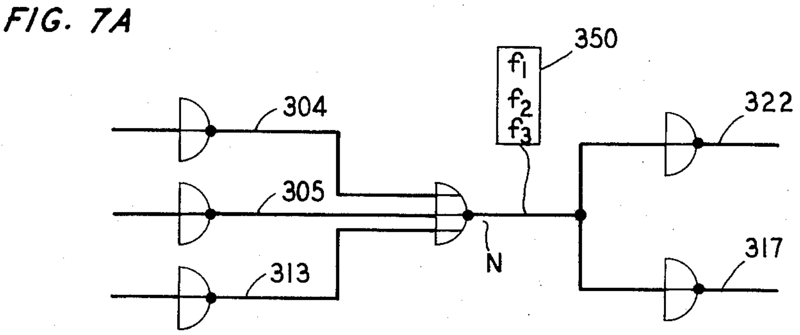
FIGS. 7A and 7B provide an example of the use of the data structures shown in FIGS. 5 and 6.
Figure 7B:
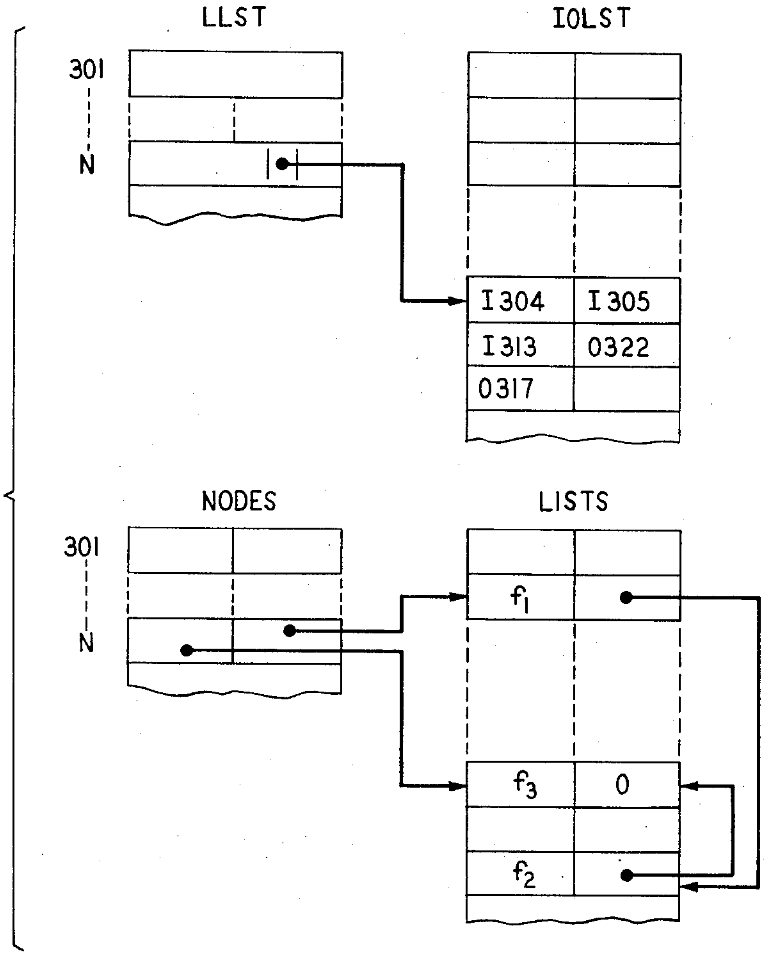

While the manner in which the simulation program uses the CSL, NSL and FSL will become apparent in the discussion of the flow charts of FIGS. 8A through 8E, the manner in which the remaining lists are used may be best understood by a consideration of the example of FIGS. 7A and 7B.

FIG. 7A shows a typical portion of a logic block. FIG. 7B shows what may be considered to be a snapshot of the entries in LLST, IOSLT, NODES, and LISTS. It is assumed that the stage of the logic circuit that contains node N has just been simulated. The resultant output fault list 350 of node N is assumed to contain faults $f_1$, $f_2$, and $f_3$. This information is stored in the manner shown in FIG. 7B.

The entry in the Nth row of LLST corresponds to the information concerning node N. It can be seen that a pointer from this row of LLST points to an entry in IOSLT. This pointer, shown symbolically in row N of LLST in FIG. 7B, corresponds to fields 286 and 288 of the typical LLST entry shown in FIG. 6. The pertinent entries in IOLST show that node N has fan-ins from nodes 304, 305 and 313 and has fan-outs to nodes 322 and 317. These entries contain the LLST row numbers of the fan-in and fan-out nodes of node N and thus serve to point back into LLST. This allows the retrieval of the current logic values on these nodes.

The entry in the Nth row of the NODES list can be seen to include two pointers. The first pointer points to $f_1$, which is the first fault in fault list 350, and the second pointer points to $f_3$, which is the last fault in fault list 350. Inspection of LISTS shows that fault $f_1$ contains a pointer to fault $f_2$ and fault $f_2$ contains a pointer to fault $f_3$. Thus entering LISTS at fault $f_1$ by means of a pointer in the Nth row of NODES allows access to each fault in the fault list of node N. The use of these two lists and the pointer systems incorporated therein allows the size of LISTS to be dynamically changed. Regardless of the change in LISTS, however, each entry in NODES provides a pointer in the beginning and end of the fault list associated with each particular node.

Figure 8A:
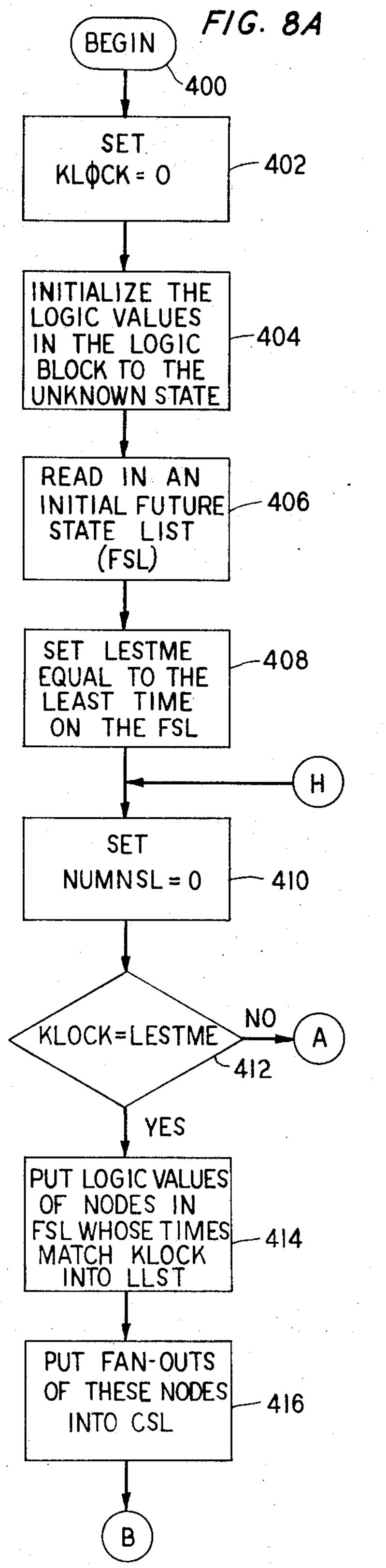
FIGS. 8A, 8B, 8C, 8D, and 8E comprise a flow chart of the machine process of this invention.
Figure 8B:
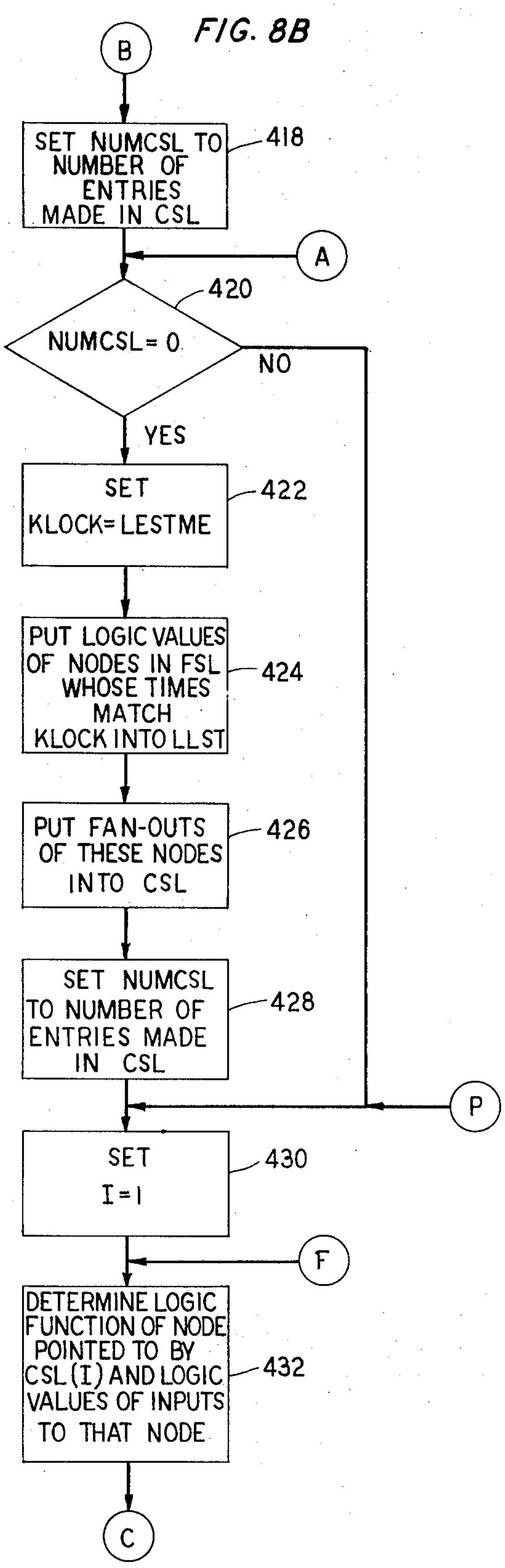

The simulation program of the present invention uses the data structures shown in FIG. 5 in the manner illustrated by the flow charts of FIGS. 8A through 8E. As shown in FIG. 8A, the simulation program is entered at terminal 400 and its first operation, at block 402, is to set KLOCK equal to zero. The value of KLOCK at any particular time during the simulation on the host computer represents the current value of the time sequence which is being simulated and which represents the dynamic action of the circuit. The current value of KLOCK must be distinguished from the value of the computation time of the host computer that is required to simulate this dynamic action in accordance with the previous discussion. Block 404 then initializes the logic values in the logic block to be simulated. This action corresponds to resetting the field, shown as field 284 in FIG. 6, of each entry in the LLST. Block 406 then reads in an initial Future State List. This initial FSL contains data for all input sequences that are to be applied during the current simulation. Each entry in the FSL contains a node number (which is an index to LLST), a logic value, and a time that the logic value is to be applied to the node. Block 408 then sets the variable LESTME equal to the time on the initial Future State List that is closest to but greater than the current value of KLOCK. Block 410 then sets NUMNSL equal to zero. NUMNSL serves as a counter on the number of entries in the NSL list.

When the initialization procedures of blocks 400 through 410 have been completed, control is transferred to conditional branch point 412. Conditional branch point 412 checks to see whether the current value of the simulated time is equal to the least time on the FSL. If it is, then this indicates that there are nodes on the FSL that are to become active during this stage of the simulation and control is transferred to block 414. Block 414 puts the logic values of the nodes in the FSL whose times match KLOCK into LLST. This action comprises making the appropriate entries in field 284 (FIG. 6) of each LLST word. Next, block 416 puts the fan-outs of these nodes into the CSL. Block 418, shown in FIG. 8B, sets NUMCSL equal to the number of entries that have thus been made in CSL and control is transferred to conditional branch point 420.

If conditional branch point 412 determines that the current value of KLOCK does not equal the current value of LESTME, this signifies that there are no FSL entries which will become active during this cycle and control can be transferred directly to conditional branch point 420.

Conditional branch point 420 tests whether or not NUMCSL is equal to zero, that is, whether the number of entries in the CSL is equal to zero. If the number of entries is zero then this indicates that the particular stage under consideration had none of its inputs changed during the last KLOCK time and thus the simulator can proceed to the next stage of the circuit. Hence block 422 sets KLOCK equal to LESTME. This serves to advance the simulator clock to the smallest time value on the Future State List to thereby pick up the next node that will become active. Block 424 puts the logic values of these nodes in LLST in a manner analogous to the action of block 414. Similarly, block 426 puts the fan-outs of these NODES into the CSL in a manner analogous to the action of block 416, and block 428 sets NUMCSL to the number of entries thereby made in the CSL in a manner analogous to the action of block 418.

If conditional branch point 420 determines that NUMCSL is not zero, that is, there are entries in the CSL which are to be processed during this cycle, then control is transferred immediately to block 430.

Operation block 430 sets I equal to one. The variable I is used as a counter on the number of CSL entries which are to be processed during the current cycle. Next, block 432 determines the logic function of the node pointed to by CSL(I) and the logic values of the current inputs to that node. These determinations are made using the data structures shown in FIGS. 5 and 7B. The Ith entry in the CSL serves as a pointer to a particular word in LLST. Accessing field 280 (FIG. 6) of that word allows the determination of the type of logic element of the particular node. The logic values of the inputs to that node are found by using fields 286 and 288 as a pointer to the IOLST. The IOLST values thus found serve to define the input nodes to the node in question, and, by using these pointers to go back into LLST, the current logic value of these input nodes can be determined by accessing field 284 of the appropriate LLST words.

Figure 8C:
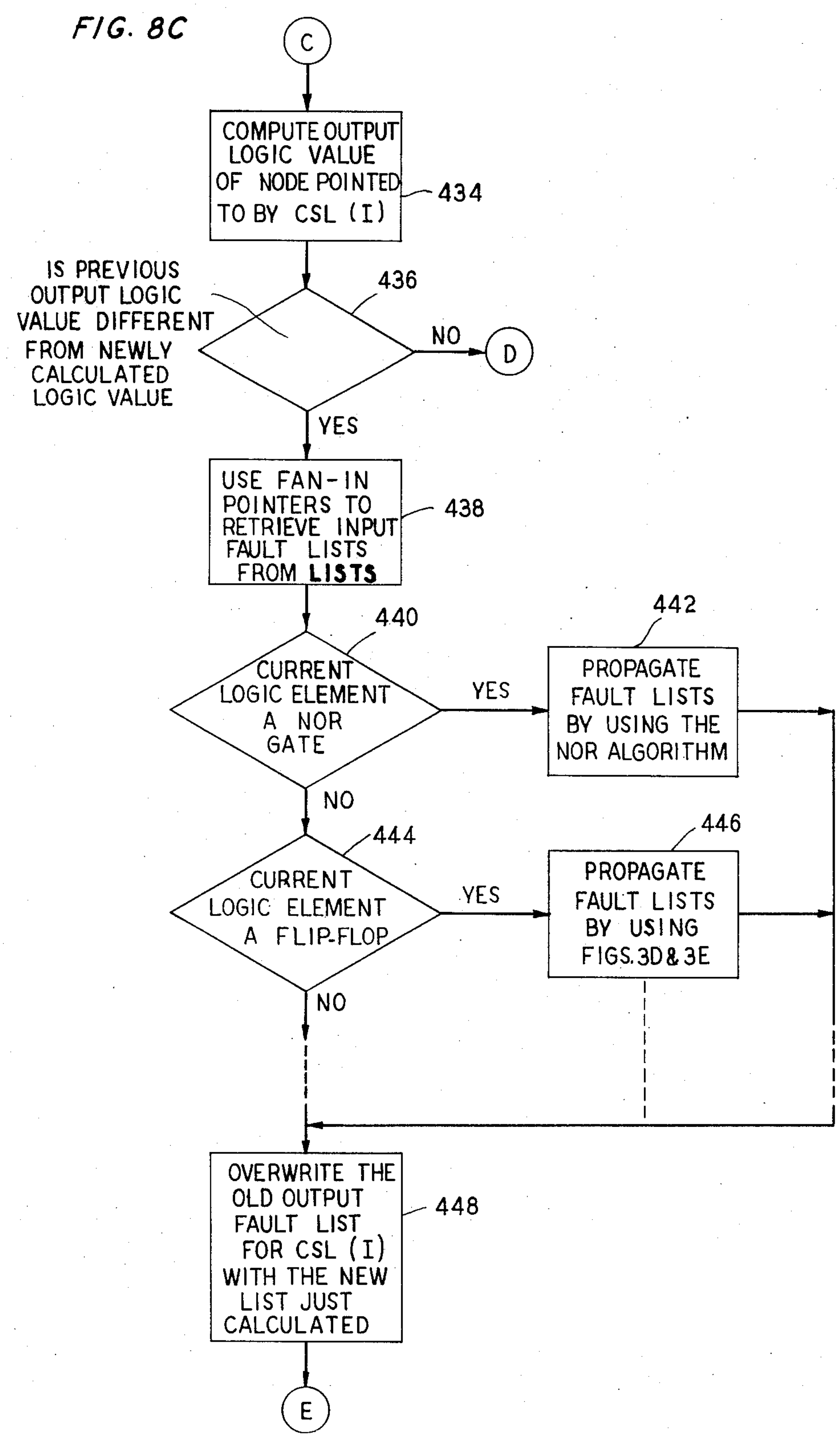

This determination of the type of logic element involved and the logic values on its inputs allows block 434, shown in FIG. 8C, to compute the output logic value of the particular node that is pointed to by CSL(I). This computation is performed by means of a simple table lookup in accordance with the previous explanation. That is, in the case of a NOR gate the table of FIG. 1B would be used while in the case of a flip-flop the table of FIG. 3B would be used.

Following the computation of the new output logic value that the node generates in response to the new inputs, conditional branch point 436 compares this new output logic value with the previous output logic value. If the output logic value has changed, then it is true that the output fault list for that particular node will change. If the output logic value has not changed, the output fault list for the node may or may not change. To cover these two contingencies, conditional branch point 436 branches to block 480 in the latter case and to block 438 in the former case.

If the new output logic value differs from the old output logic value, block 438 uses data structures 260 and 262 (FIG. 5) in a manner analogous to the description accompanying FIG. 7A to retrieve the input fault lists for the node. Once these fault lists have been obtained, the next step is to propagate them through the particular logic element of the node. If the node comprises a NOR gate, conditional branch point 440 transfers control to block 442 and the fault lists are propagated by using the NOR algorithm in the manner previously described. If the node comprises a flip-flop, conditional branch point 444 transfers control to block 446 and the fault lists are propagated by using Table 1 in the manner previously described. If the particular digital system being simulated contains elements other than NOR gates and flip-flops, suitable conditional branch points and operation blocks would be inserted in the flow chart in place of the elipses following conditional branch point 444 and operation block 446.

When the fault lists have thus been propagated, the new fault list is overwritten in place of the old fault list for CSL(I). This overwriting is done by changing the pointers in the NODES list, the entries in the LISTS list, and the internal pointers in the LISTS list in a manner which is obvious to those skilled in the art. It is this step of overwriting old fault lists with new fault lists that is responsible for the requirement of a dynamic list structure. The overwriting can be alternatively accomplished by using a dynamic linked list procedure or other procedures well-known to those skilled in the art without departing from the spirit and scope of the invention. For example, descriptions of suitable alternative procedures may be found in Section 2.5, "Dynamic Storage Allocation," page 435 et seq. of the well-known reference The Art of Computer Programming, Vol. I/ Fundamental Algorithms by Donald E. Knuth, Addison-Wesley Publishing Company, 1968.

Figure 8D:
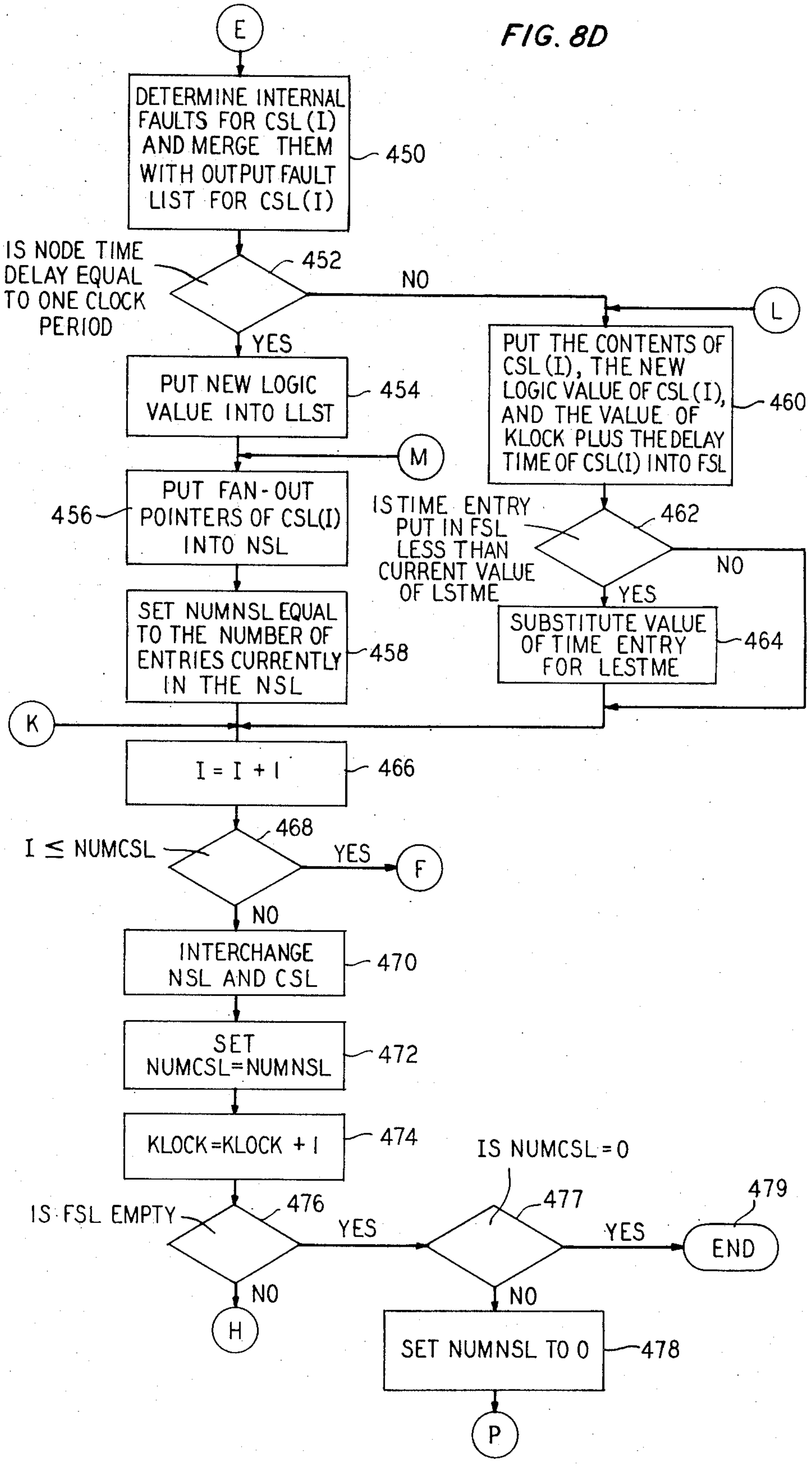

Operation block 450, shown in FIG. 8D, completes the fault list by determining the internal faults for CSL(I), the current node under consideration, and merging them with the output fault list just computed. This procedure, in effect, serves to inject new faults into the fault list which will continue to propagate through the circuit. The manner in which these internal faults are determined can best be understood by referring to the data structures shown in FIGS. 9A and 9B.

Figures 9A, 10A, 10B:
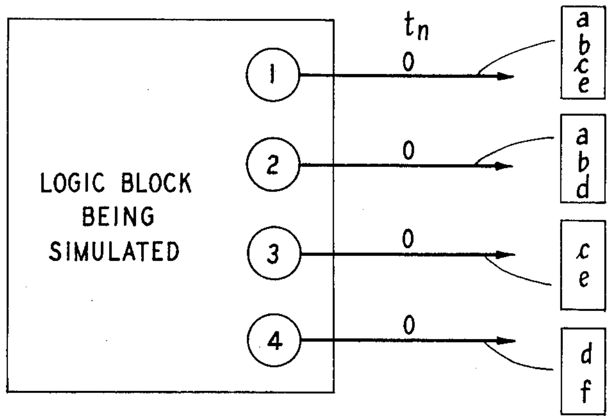

FIG. 9A shows the All Fault Table. This table comprises a list of all logic elements in the system along with all those internal faults that have been selected for simulation in the manner previously described. Each such fault for each logic element is assigned an absolute fault number which is unique to that fault. Each logic element is uniquely described by means of a hardware location description. Thus system engineers, given an absolute fault number, could determine the exact physical location of the faulty element. The All Fault Table shown in FIG. 9A is included in this description merely for illustrative purposes. This table is not stored in memory during the execution of the simulation program. Instead, the indexing scheme explained below is used to compute the absolute fault number for each fault by using the internal fault code of field 282 and the contents of the Fault Truth Table shown in FIG. 9B.

The Fault Truth Table of FIG. 9B has one entry for each unique type of logic element in the system being simulated. For example, a 4-input NOR gate has an entry distinct from a 3-input NOR gate. The Fault Truth Table contains, for each type of logic element, a list of all possible inputs to that element and the list of those detectable internal faults that correspond to each set of inputs. Thus the Fault Truth Table uses the information contained in the individual element fault tables such as those shown in FIG. 1C and FIG. 3C.

In order to access the Fault Truth Table, operation block 450 must use the results obtained by operation block 432. That is, both the logic element type and the inputs to the logic element must be known to access the Fault Truth Table. This access results in determining the internal fault numbers of the faults that are currently detectable at the node's output. These internal fault numbers are then converted to absolute fault numbers by using the internal fault code of field 282 of the node's LLST entry. The value of the internal fault code for each node is one less than the value of the absolute fault number of the nodes first entry in the All Fault Table. For example, as can be seen from FIG. 9A, the internal fault code corresponding to the four-input NOR gate 68Z would be 36.

The internal fault code of field 282 is thus seen to serve as a pointer to that portion of the All Fault Table that includes all of that particular node's internal fault entries. Hence, combining the internal fault code of a particular node with the internal fault numbers from the Fault Truth Table yields the absolute fault numbers of all the currently detectable internal faults of the node. For example, if the inputs to gate 68Z are all 0's the Fault Truth Table indicates that the appropriate internal fault numbers are 1, 9, 10 and 11. Combining these with the value of the internal fault code yields 37, 45, 46, and 47 as the absolute fault numbers.

Returning then to the flow chart of FIG. 8D, after block 450 has determined the internal faults for CSL(I) and merged them to the output fault list for CSL(I) by making the appropriate entries in the NODES and LLSTS data structures, control is transferred to conditional branch point 452. Conditional branch point 452 checks whether the time delay of the node under consideration is equal to one KLOCK period. It does this by checking field 290 of the corresponding LLST entry. If the node delay time is not equal to one KLOCK period, it is necessary to place the information concerning the node into the Future State List. Block 460 does this by putting the contents of CSL(I), the new logic value of the node corresponding to CSL(I), and the sum of the current value of KLOCK plus the node delay time into the Future State List. Conditional branch point 462 then checks to see whether the time entry thus computed is less than the current value of LESTME. If it is, this value must be substituted for the current value of LESTME by block 464. If it is not, control can be transferred directly to block 466.

If conditional branch point 452 finds that the node's time delay is equal to one KLOCK period the Future State List need not be entered and control is transferred to block 454.

Block 454 puts the new logic value that was computed in block 434 into field 284 of the LLST entry pertaining to CSL(I). Block 456 puts the fan-out pointers of CSL(I) into the Next State List. This is done because the output of the nodes in the Current State List are nodes that may change during the next time period and hence be under consideration during the next cycle. Block 458 sets the variable NUMNSL equal to the number of entries currently on the Next State List. Block 466 then increments the value of I, which is the index of CSL(I), and thus enables the program to pick up the next entry in the Current State List that is to be processed.

Conditional branch point 468 next compares the value of I with the value of NUMCSL to determine whether or not all entries in the Current State List have been processed. If all the entries have not been processed, control is returned to block 432 to process the next entry. If all of the entries in the CSL have been processed, control is transferred to block 470. Transfer of control to block 470 indicates that the entire contents of the current state list have been processed and that the simulator is ready to move to the next stage of the circuit. Thus block 470 interchanges the contents of the Next State List and the Current State List. This in effect transfers to the Current State List all entries corresponding to nodes in the next stage of the circuit to be simulated. Block 472 sets NUMCSL equal to NUMSL, thus providing an indication of the number of entries that have been transferred to the Current State List. Block 474 increments the system KLOCK and transfers control to conditional branch point 476.

Conditional branch point 476 is a test to determine whether the desired simulation has been performed. If the Future State List is empty, this means that there are no input sequences that remain to be applied and control is transferred to conditional branch point 477. Conditional branch point 477 determines whether there are any entries remaining on the CSL to be processed. If not, then this means that all input sequences that were to be applied have been completely simulated and the program terminates at terminal 479. If there are more entries on the CSL, control is transferred to block 478. Block 478 sets NUMNSL to zero since conditional branch point 476 has determined that the FSL is empty. Control is then transferred to block 430 shown in FIG. 8B to process the remaining CSL entries.

If conditional branch point 476 determines that the FSL is not empty, control is transferred to block 410 shown in FIG. 8A and the simulation proceeds in the manner previously described.

Figure 8E:
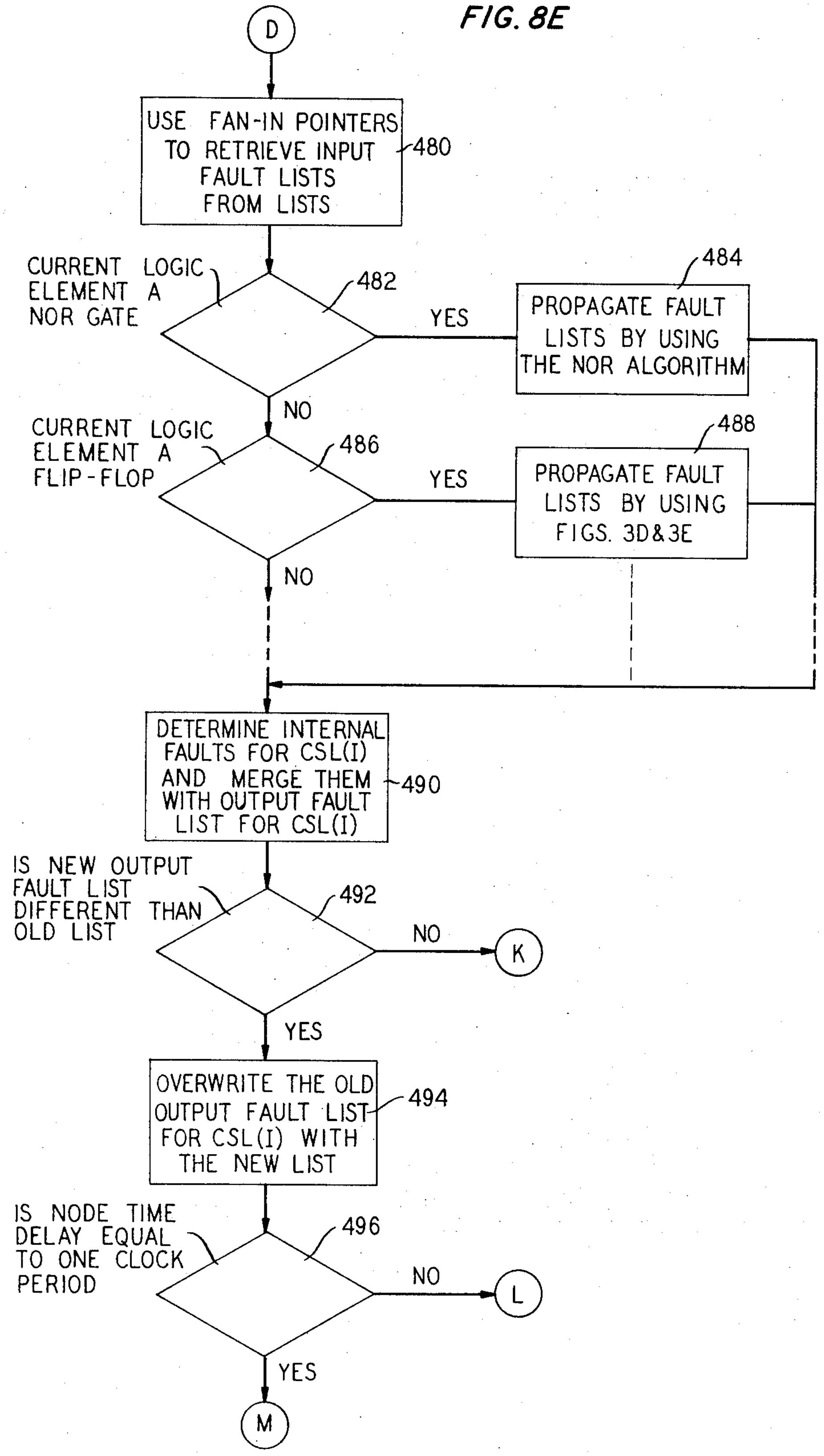

The remaining flow chart branch, shown in FIG. 8E, is entered if conditional branch point 436 determines that the output logic value computed in block 434 differs from the previous output logic value of the node pointed to by CSL(I). Upon entering this branch, block 480 uses the fan-in pointers to retrieve the input fault list from LISTS in the same manner as block 438. Blocks 482 to 488 then propagate the fault lists in the same manner as previously described in connection with blocks 440 to 446. Next, block 490 determines the internal faults for CSL(I) in the same manner as block 450. Conditional branch point 492 then tests whether the new output fault list just computed differs from the old list. If it does not, this indicates that the propagation of fault lists has ceased and control may be transferred to block 466 for the simulation of the next stage of the circuit. If the newly computed output fault list does differ from the old list, control is transferred to block 494 which overwrites the old output fault list for CSL(I) with the newly computed fault list and transfers control to conditional branch point 496. Conditional branch point 496 tests whether or not the time delay corresponding to the node currently being simulated is equal to one KLOCK period. If it is not, control is transferred to block 496 to make the appropriate entries in the Future State List. If it is, control is transferred to block 456 and the simulation is continued by putting the appropriate entries into the Next State List.

The flow charts of FIGS. 8A through 8E describe the basic process comprising the present invention. This basic process may be adapted to fit particular digital logic systems in a variety of ways without deviating from the spirit and scope of the present invention. As an illustration two such adaptations will now be presented.

The embodiment of the process that is shown in the flow charts of FIGS. 8A to 8E implicitly assumes that the delay of each logic element of the circuit is a multiple of the average single-stage delay time. Thus the process shown in the flow charts steps through the circuit on a stage by stage basis. If such assumption is not warranted, that is, if in a particular logic system the delays of various elements are not integral multiples of the average single stage delay time, the following modifications must be performed. Field 290 of each LLST entry must contain the actual value of the delay of the particular element. Block 474 of the flow chart must be changed to read "KLOCK = LESTME." Block 494 must transfer control directly to block 460, and block 450 must transfer control directly to block 460. In addition, blocks 410, 452, 454, 456, 458, 470, and 472 must be eliminated. The effect of these changes is to do away with the Next State List. The program will then go to the Future State List each time the Current State List has become empty, and the program will no longer toggle back and forth between the Current State List and the Next State List.

The machine process comprising the present invention can be made more efficient if reconverging fan-out nodes are taken into account. A node is a reconverging fan-out node if any two or more of its fan-ins can be traced back to the fan-out of a single node. In this adaptation, a bit, shown as field 292 in FIG. 6, would have to be added to each LLST entry. Thus each node that is a reconverging fan-out NODE would have to have an entry in field 292 of its LLST entry. In this adaptation nodes that are reconverging fan-out nodes are treated in exactly the same manner as previously discussed. However, nodes that are not reconverging fan-out nodes, and whose associated logic elements are NOR gates, can have fault lists propagated through them according to the following simplified algorithm. If all logical inputs to the gate are 0, the output fault list is the union of all input fault lists. If a single logical input value is a 1 the output fault list is identical to the input fault list on the input that has the value 1. If more than one input logic value is a 1 no input fault lists are propagated through the gate. In each case, as previously, internal faults must be separately considered and merged into the output fault list. This simplified algorithm applies to both OR and NOR gates. A similar algorithm applicable to AND and NAND gates can be found by interchanging "1" and "0" in the algorithm applicable to OR and NOR gates.

When the fault lists have been obtained, the fault dictionary may be constructed in accordance with techniques well-known to those skilled in the art. This may be done, for example, in the following manner.

Suppose nodes 1, 2, 3 and 4 shown in FIG. 10A constitute a monitorable register and that the test sequence calls for error symptoms to be recorded for all faults which produce observable errors at the register at time $t_n$. Suppose further that the error-free output at time $t_n$ is 0000, and that the fault lists shown in FIG. 10A have been generated by the simulation program for the time $t_n$. This implies, for example, that faults *a* and *b* are detectable at nodes 1 and 2 but not at nodes 3 and 4 at $t_n$. Therefore, the error symptom produced by faults *a* and *b* is the same and corresponds to the bit pattern 1100 being generated at $t_n$ instead of 0000. Thus the error symptom of faults *a* and *b* at this monitorable register at time $t_n$ is 1100. A complete table of error symptoms and their associated faults for the example of FIG. 10A is shown in FIG. 10B. Thus FIG. 10B is the fault dictionary for the simple example of FIG. 10A.

APPENDIX

What is claimed is:

1. An automated process of constructing an output fault list for digital circuitry including at least one pair of cascaded logic elements, said process comprising the use of a programmed digital computer having stored in its internal memory a program enabling the computer to periodically perform the following steps:
   - determining the particular logic elements having inputs or input fault lists that changed during the preceding computation; and
   - computing for each of said particular logic elements the error-free output and a list of all faults on the input fault lists of that particular element and all possible internal faults of that particular element which alter the output of that particular logic element.

2. An automated process of computing lists of fault conditions that can be detected in a logic circuit containing a plurality of cascaded logic elements, said process comprising the use of a programmed digital computer having stored in its interval memory a program enabling the computer to perform at periodic intervals the following steps:

computing a list of active logic elements, that is, those logic elements having inputs or input fault lists that changed during the preceding interval;

computing the error-free output of each active logic element;

computing for each particular active logic element a first list of only those fault conditions on the input fault lists of said particular element capable of propagating through said particular element, thereby causing the output signal of said particular element to be complemented;

computing a second list of those fault conditions occurring within said particular active logic element that cause said output signal to be complemented; and combining said first and second lists to form the output fault list of said particular logic element.

3. The machine process of claim 2 further comprising the automated step of;

flagging each logic element having as an input the output of one of said active logic elements.

4. The automated process of claim 2 wherein said step of computing a first list of only those fault conditions that are capable of propagating through said particular logic element further comprises, in case said particular logic element is a NOR gate or an OR gate, the automated steps of:

forming the mathematical set intersection, I, of the fault lists on all inputs to said particular logic element that have an error-free logic value of 1;

forming the mathematical set union, U, of the fault lists on all inputs to said particular logic element that have an error-free logic value of 0;

setting said list of fault conditions equal to the mathematical set difference I-U if any of said inputs to said particular logic element have an error-free logic value of 1; and setting said list of fault conditions equal to said set union U if all of said inputs to said particular logic element have an error-free logic value of 0.

5. The automated process of claim 2 wherein said step of computing a first list of only those fault conditions that are capable of propagating through said particular logic element further comprises, in case said particular logic element is a NAND or an AND gate, the automated steps of:

forming the mathematical set intersection, I, of the fault lists on all inputs to said particular logic element that have an error-free logic value of 0;

forming the mathematical set union, U, of the fault lists on all inputs to said particular logic element that have an error-free logic value of 1;

setting said list of fault conditions equal to the mathematical set difference I-U if any of said inputs to said particular logic element have an error-free logic value of 0; and setting said list of fault conditions equal to said set union U if all of said inputs to said particular logic element have an error-free logic value of 1.

6. The automated process of claim 2 wherein said step of computing a first list of only those fault conditions that are capable of propagating through said particular logic element further comprises, in case said particular logic element is a NOR gate or an OR gate, the automated steps of:

determining whether said particular logic element is a reconverging fan-out element;

performing the following four steps if said particular logic element is a reconverging fan-out element:

forming the mathematical set intersection, I, of the fault lists on all inputs to said particular logic element that have an error-free logic value of 1, forming the mathematical set union, U, of the fault lists on all inputs to said particular logic element that have an error-free logic value of 0, setting said list of fault conditions equal to the mathematical set difference I-U if any of said inputs to said particular logic element have an error-free logic value of 1, and setting said list of fault conditions equal to said set union U if all of said inputs to said particular logic element have an error-free logic value of 0;

and performing the following three steps if said particular logic element is not a reconverging fan-out element:

setting said list of fault conditions equal to the mathematical set union of the fault lists on all inputs to said particular logic element if the error-free logic values on all said inputs are 0;

setting said list of fault conditions equal to the fault list on the input to said particular logic element that has an error-free logic value of 1 if only one of the inputs to said particular logic element has an error-free logic value of 1; and setting said list of fault conditions equal to the null set if more than one of the inputs to said particular logic element has an error-free logic value of 1.

7. The machine process of claim 2 wherein said step of computing a first list of only those fault conditions that are capable of propagating through said particular logic element further comprises, in case said particular logic element is a flip-flop, the machine steps of:

determining the current error-free output logic values of said flip-flop;

determining the current input and output fault lists of said flip-flop;

determining the new error-free input logic values that are to be applied to said flip-flop;

accessing a table having information such as that shown in FIGS. 3D and 3E, by using said current output logic values and said new input logic values, to determine the relationship between said current input and output fault lists and the new output fault lists that will result from the application of said new error-free input logic values to said flip-flop; and using said current input and output fault lists to compute said new output fault lists in accordance with said relationship.

8. The automated process of claim 2 wherein said step of computing a first list of only those fault conditions that are capable of propagating through said particular logic element further comprises, in case said particular logic element is a NAND gate or an AND gate, the automated steps of:

determining whether said particular logic element is a reconverging fan-out element;

performing the following four steps if said particular logic element is a reconverging fan-out element:

forming the mathematical set intersection, I, of the fault lists on all inputs to said particular logic element that have an error-free logic value of 0, forming the mathematical set union, U, of the fault lists on all inputs to said particular logic element that have an error-free logic value of 1, setting said list of fault conditions equal to the mathematical set difference I-U if any of said inputs to said particular logic element have an error-free logic value of 0, and, setting said list of fault conditions equal to said set union U if all of said inputs to said particular logic element have an error-free logic value of 1;

and performing the following three steps if said particular logic element is not a reconverging fan-out element:

setting said list of fault conditions equal to the mathematical set union of the fault lists on all inputs to said particular logic element if the error-free logic values on all said inputs are 1;

setting said list of fault conditions equal to the fault list on the input to said particular logic element that has an error-free logic value of 0 if only one of the inputs to said particular logic element has an error-free logic value of 0; and setting said list of fault conditions equal to the null set if more than one of the inputs to said particular logic element has an error-free logic value of 0.

9. A system for performing a plurality of periodic computations so as to construct a fault list for digital circuitry including at least one pair of cascaded logic elements, said system comprising:

means for determining the particular logic elements having inputs or input fault lists that changed during the preceding computation; and means for computing for each of said particular logic elements the error-free output and a list of all faults on the input fault lists of that particular element and all possible internal faults of that particular element which alter the output of that particular logic element.

10. Apparatus for performing a plurality of computations at periodic intervals so as to compute lists of fault conditions that can be detected in a logic circuit containing a plurality of cascaded logic elements, said apparatus comprising:

means for computing a list of active logic elements, that is, those logic elements having inputs or input fault lists that changed during the preceding interval;

means for computing the error-free output of each active logic element;

means for computing for each particular active logic element a first list of only those fault conditions on the input fault lists of said particular element capable of propagating through said particular element, thereby causing the output signal of said particular element to be complemented;

means for computing a second list of only those fault conditions occurring within said particular active logic element that cause said output signal to be complemented; and means for combining said first and second lists to form the output fault list of said particular logic element.

11. The apparatus of claim 10 further comprising:

means for flagging each logic element having as an input the output of one of said active logic elements.

12. The apparatus of claim 10 wherein said means for computing a first list of only those fault conditions that are capable of propagating through said particular logic element further comprises, in case said particular logic element is a NOR gate or an OR gate:

means for forming the mathematical set intersection, I, of the fault lists on all inputs to said particular logic element that have an error-free logic value of 1;

means for forming the mathematical set union, U, of the fault lists on all inputs to said particular logic element that have an error-free logic value of 0;

means for setting said list of fault conditions equal to the mathematical set difference I-U if any of said inputs to said particular logic element have an error-free logic value of 1; and means for setting said list of fault conditions equal to said set union U if all of said inputs to said particular logic element have an error-free logic value of 0.

13. The apparatus of claim 10 wherein said means for computing a first list of only those fault conditions that are capable of propagating through said particular logic element further comprises, in case said particular logic element is a NAND or an AND gate:

means for forming the mathematical set intersection, I, of the fault lists on all inputs to said particular logic element that have an error-free logic value of 0;

means for forming the mathematical set union, U, of the fault lists on all inputs to said particular logic element that have an error-free logic value of 1;

means for setting said list of fault conditions equal to the mathematical set difference I-U if any of said inputs to said particular logic element have an error-free logic value of 0; and means for setting said list of fault conditions equal to said set union U if all of said inputs to said particular logic element have an error-free logic value of 1.

14. The apparatus of claim 10 wherein said means for computing a first list of only those fault conditions that are capable of propagating through said particular logic element further comprises, in case said particular logic element is a flip-flop:

means for determining the current error-free output logic values of said flip-flop;

means for determining the current input and output fault lists of said flip-flop;

means for determining the new error-free input logic values that are to be applied to said flip-flop;

means for accessing a table having information such as that shown in FIGS. 3D and 3E, by using said current output logic values and said new input logic values, to determine the relationship between said current input and output fault lists and the new output fault lists that will result from the application of said new error-free input logic values to said flip-flop; and means for using said current input and output fault lists to compute said new output fault lists in accordance with said relationship.

* * * * *